(12) United States Patent
Perry

(10) Patent No.: US 6,508,505 B1
(45) Date of Patent: Jan. 21, 2003

(54) STIFFENER BAR BEZEL

(75) Inventor: Scott B Perry, Riverview, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/035,012

(22) Filed: Dec. 27, 2001

(51) Int. Cl.⁷ .............................................. B60R 27/00
(52) U.S. Cl. ............. 296/189; 296/190.03; 296/190.08; 296/35.2; 280/756
(58) Field of Search ................................ 296/188, 189, 296/190.03, 190.08, 204, 104, 102, 35.2, 37.7; 280/756

(56) References Cited

U.S. PATENT DOCUMENTS

| | | | | |
|---|---|---|---|---|
| 3,622,177 A | * | 11/1971 | Notestine et al. ............ 296/102 |
| 3,985,386 A | * | 10/1976 | Woods ......................... 296/102 |
| 4,411,464 A | * | 10/1983 | Bauer .......................... 296/102 |
| 4,813,706 A | * | 3/1989 | Kincheloe .................... 280/756 |
| 5,174,622 A | * | 12/1992 | Gutta .......................... 296/102 |
| 5,503,430 A | * | 4/1996 | Miki et al. ................... 280/756 |
| 5,718,454 A | * | 2/1998 | Harrod ......................... 296/102 |
| 5,779,271 A | * | 7/1998 | Dorow et al. ................ 296/189 |
| 5,949,991 A | * | 9/1999 | LeBlanc ....................... 703/14 |
| 6,189,962 B1 | * | 2/2001 | Henderson ................... 280/756 |
| 6,419,304 B1 | * | 7/2002 | Richardson et al. ......... 296/188 |

* cited by examiner

Primary Examiner—D. Glenn Dayoan
Assistant Examiner—Lori L Coletta
(74) Attorney, Agent, or Firm—Mark P. Calcaterra

(57) ABSTRACT

An enhanced stiffener bar assembly including a stiffener bar covered with a protective energy-absorbing material. The stiffener bar contains at least one receptor for receiving a door frame. The area surrounding the receptor is bordered by a bezel. The bezel is secured to the protective energy-absorbing material and protects the material during installation of the door frame and provides a covering for any exposed material.

10 Claims, 5 Drawing Sheets

STIFFENER BAR BEZEL

FIELD OF THE INVENTION

The present invention relates to motor vehicles. More particularly, the present invention relates to motor vehicle frame stiffener bars.

BACKGROUND OF THE INVENTION

Structural reinforcements are commonly employed within motor vehicles to enhance the rigidity of the motor vehicle frame and to provide an increased level of protection against intrusion into the passenger compartment during a collision or rollover. One type of structural reinforcement used is a stiffener bar assembly placed along the motor vehicle roofline between the motor vehicle A-pillar and B-pillar. Such a stiffener bar assembly is comprised of a stiffener bar made of a rigid material, such as a metal, and is attached to the A-pillar and B-pillar using a sufficient fastening device, such as one or more bolts.

Use of the above-described stiffener bar assembly adds to the overall rigidity of the motor vehicle by helping to maintain the relationship between the A-pillar and B-pillar, even during a severe collision or rollover. Consequently, use of the stiffener bar assembly helps to maintain the integrity of the motor vehicle passenger compartment and helps to protect those passengers seated within the passenger compartment. The above-described stiffener bar assembly is often covered with an energy-absorbing material to protect the passenger compartment occupants from injury that may result from contact with the bar.

While the above described stiffener bar assembly has proven to be commercially acceptable for its intended applications, it is amenable to improvement. Specifically, the above described assembly fails to provide for an energy-absorbing material having an additional protective layer that surrounds the interface between the stiffener bar and a door frame so as to permit engagement of the stiffener bar by the door frame without the energy-absorbing material being damaged. Further, the above described stiffener bar fails to provide a cover that is able to seal the periphery of the energy-absorbing material surrounding the interface between the door frame and the stiffener bar. Consequently, there is a need for a stiffener bar possessing such features.

SUMMARY OF THE INVENTION

The present invention overcomes the prior art deficiencies by providing an enhanced stiffener bar assembly. The enhanced stiffener bar assembly includes a stiffener bar covered with a protective energy-absorbing material. The stiffener bar contains at least one receptor for receiving a door frame. The area surrounding the receptor is bordered by a bezel. The bezel is secured to the protective energy-absorbing material and protects the material during installation of the door frame and provides a covering for any exposed material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
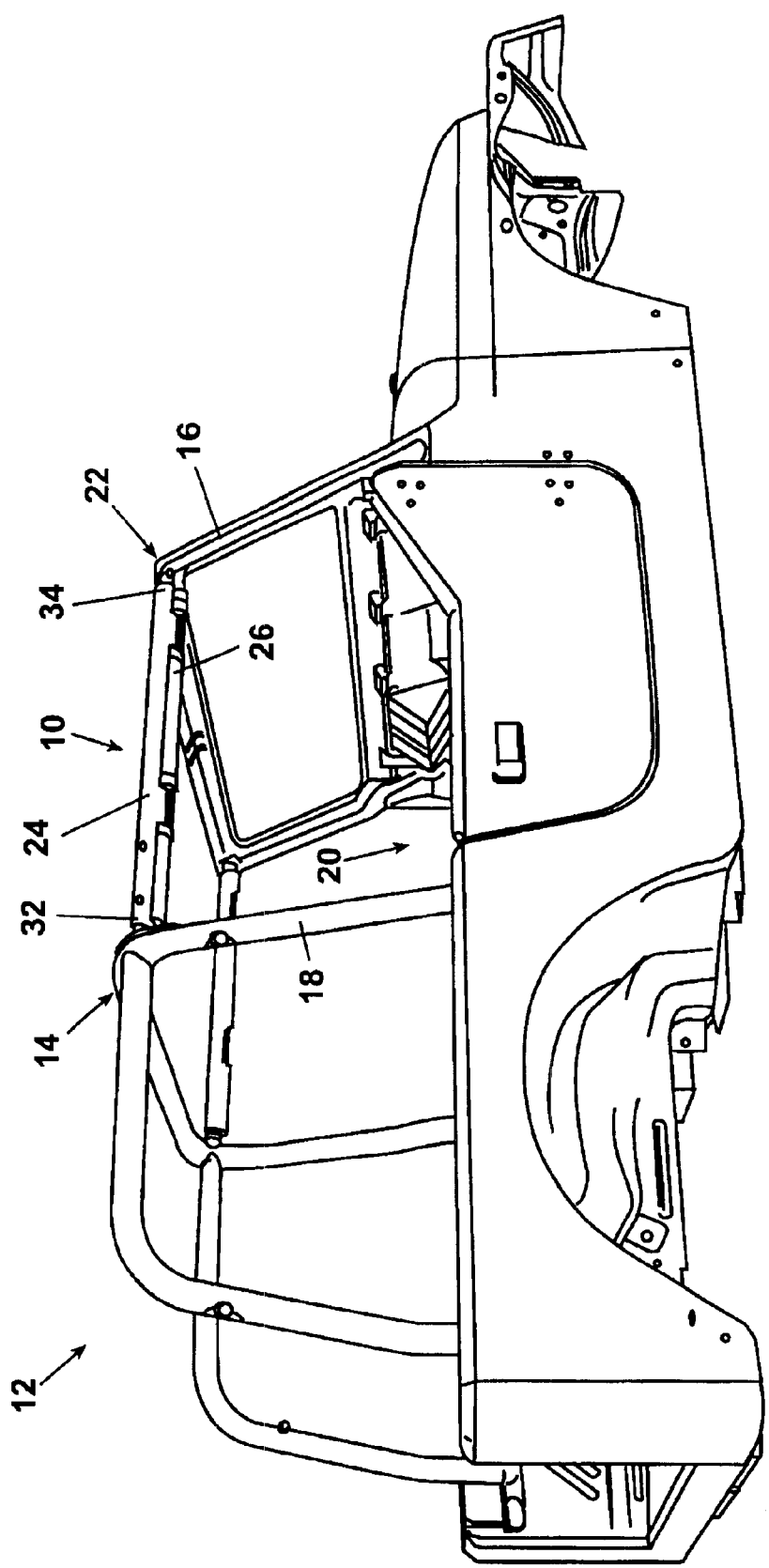
FIG. 1 is a schematic illustration of a motor vehicle incorporating a stiffener bar constructed in accordance with the teachings of a preferred embodiment of the present invention.

With reference to FIG. 1 of the drawings, a structural reinforcement in the form of a stiffener bar assembly constructed in accordance with the teachings of the present invention is generally identified at reference numeral 10. The stiffener bar assembly 10 is shown operatively installed within an exemplary motor vehicle 12. However, it will become apparent to those skilled in the art that the teachings of the present invention have applicability to a wide range of vehicles.

With continued reference to FIG. 1 and additional reference to FIGS. 2 through 5, the stiffener bar assembly 10 of the present invention will now be described in greater detail. The stiffener bar assembly 10 is incorporated into a frame 14 of the motor vehicle 12. The frame 14 consists of, among other components, an A-pillar 16 and a B-pillar 18, which together partially define a passenger cabin 20. The stiffener bar assembly 10 is located between the A-pillar 16 and the B-pillar 18 and is connected to each pillar 16 and 18 along a roofline 22 of the motor vehicle 12.

The stiffener bar assembly 10 consists of a stiffener bar 24, a protective energy-absorbing covering 26, at least one bezel 28, and a trail cloth cover 30. The stiffener bar 24 is made from a suitably rigid material, such as a metal. The bar 24 has a first end 32 and a second end 34, along with an upper portion 36, a lower portion 38, an interior portion 40, and an exterior portion 42. The first end 32 is secured to the B-pillar 18 and the second end 34 is secured to the A-pillar 16. First end 32 and second end 34 are secured using a suitable fastening device, such as one or more bolts. Due to the position and rigidity of the stiffener bar 24, the bar 24 helps maintain the distance between the A-pillar 16 and the B-pillar 18 and thus maintains the integrity of the passenger cabin 20 so as to protect the motor vehicle passengers in the event of a collision or rollover.

At least a portion of the stiffener bar 24, preferably the lower portion 38 and the inner portion 40, is covered with the protective energy-absorbing cover 26. The protective cover 26 may be made of any suitable energy-absorbing material, such as energy-absorbing foam. The protective cover 26 continuously extends from the first end 32 of the stiffener bar 24 to the second end 34 of the stiffener bar 24. The protective cover 26 is secured to the bar 24 using a suitable fastening device such as plastic clips (not specifically shown), which are molded to the protective cover 26 and which cooperate with grooves (not specifically shown)

of the stiffener bar 24. Only a portion 44 of the protective cover 26 is secured to the stiffener bar 24 while a remaining portion 46 is not secured to the stiffener bar 24 and creates a well 48 between the stiffener bar 24 and the remaining portion 46. The protective cover 26 provides the bar 24 with a cushion so as to soften any contact an occupant of the motor vehicle may have with the bar 24, especially during any contact that occurs as a result of a collision or rollover.

Figure 2:
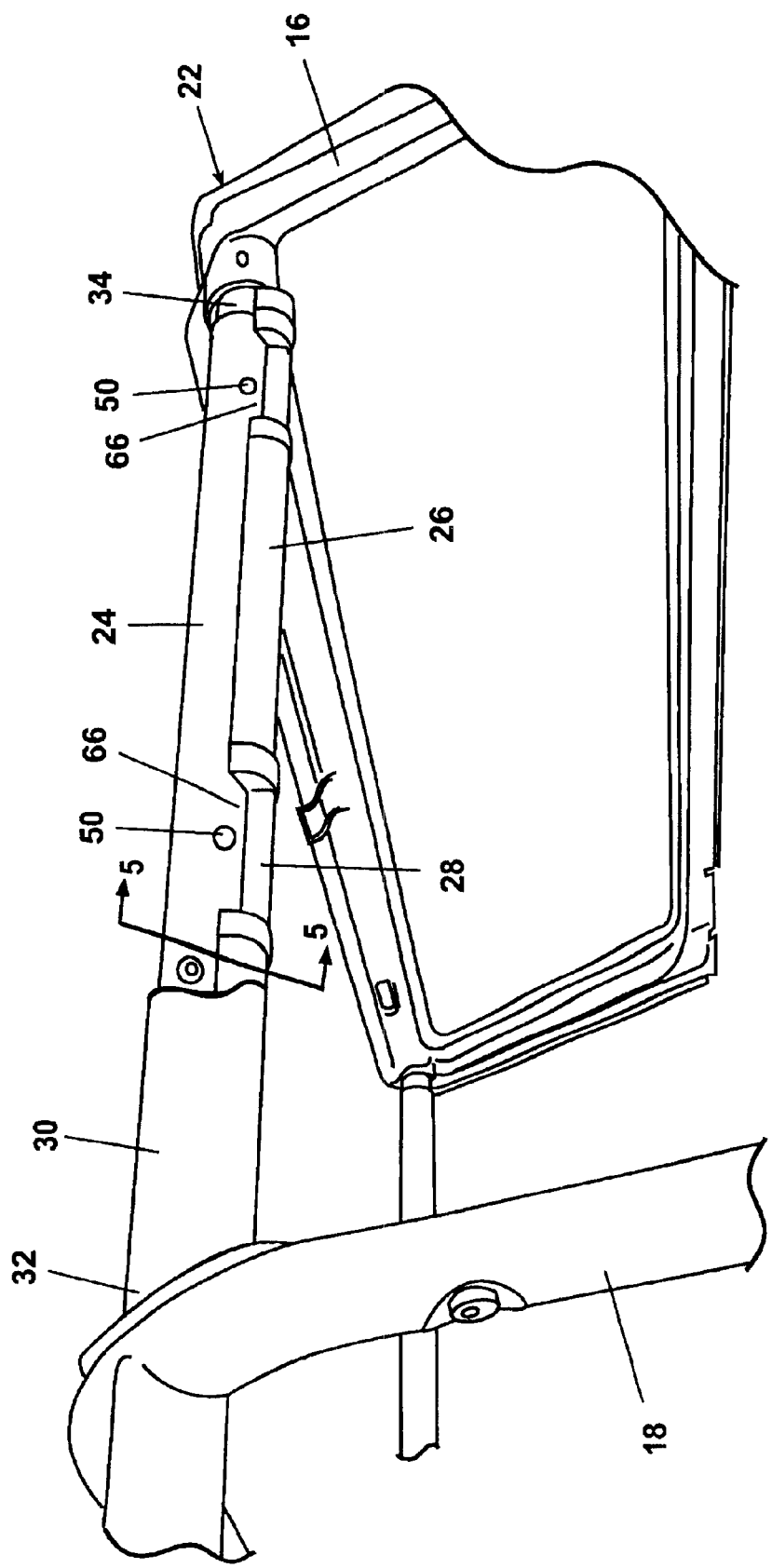
FIG. 2 is an expanded view of FIG. 1 illustrating the stiffener bar assembly.
Figure 3:
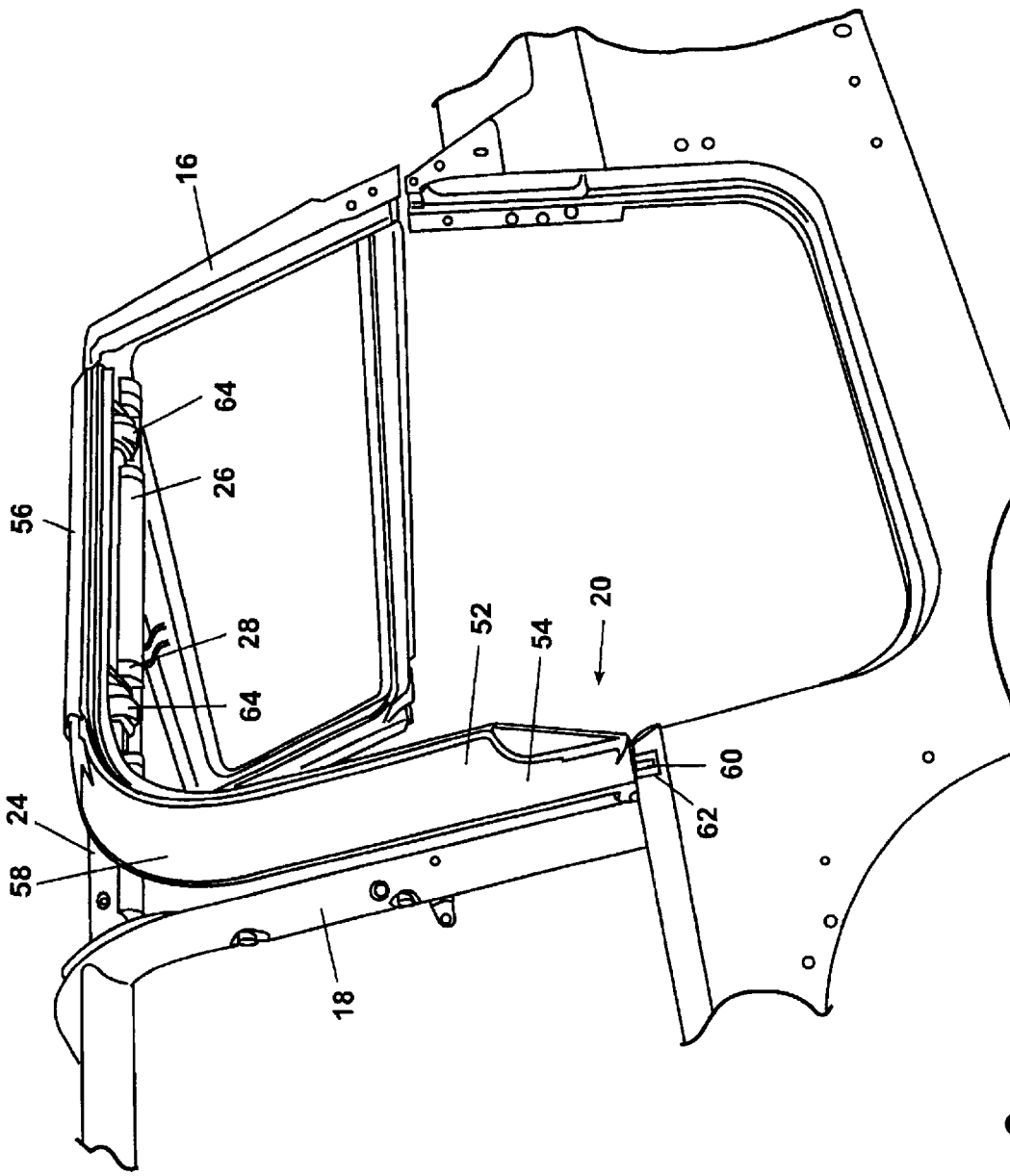
FIG. 3 is a schematic illustration of the stiffener bar of FIG. 1 engaged by a door frame.
Figure 4:
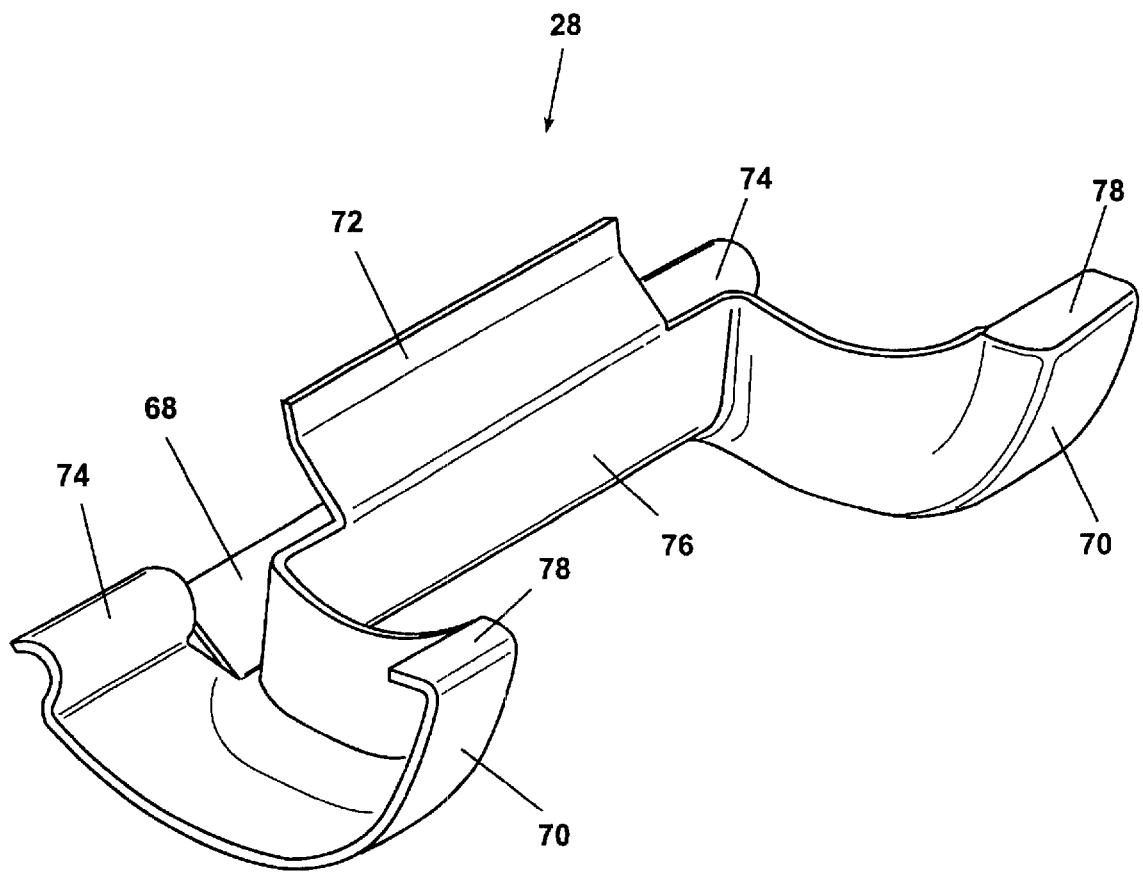
FIG. 4 is a schematic illustration of a stiffener bar bezel in accordance with the teachings of a preferred embodiment of the present invention.

As shown in FIGS. 1 and 2, the stiffener bar 24 contains at least one receptor 50 for receiving a door frame 52. The receptor 50 extends through the stiffener bar 24 from the upper portion 36 to the lower portion 38. The door frame 52 serves as a receptor for a motor vehicle door (not shown). The door frame 52 includes a vertical portion 54 and a horizontal portion 56 connected by a curved portion 58. The vertical portion 54 extends parallel to the B-pillar 18 and contains a pin 60 that is received by a receptor 62 of the motor vehicle frame 14 so as to secure the vertical portion 54 to the frame 14. The horizontal portion 56 extends parallel to the stiffener bar 24 and contains at least two receptors, preferably in the form of C-clamps 64. The C-clamps 64 engage the upper portion 36, the lower portion 38, and the exterior portion 42 of the stiffener bar 24. The C-clamps 64 also contain a pin (not shown) that is received by the receptor 50 so as to secure the C-clamps 64 to the stiffener bar 24. The portion of the protective cover 26 surrounding the lower portion 38 of the stiffening bar 24 having receptor 50 is removed so as to allow the C-clamp 64 to engage the stiffening bar 24. Removal of the portions of the protective cover 26 surrounding receptor 50 results in the formation of a channel 66 exposing the lower portion of the stiffener bar 24 and interior portions of the protective cover 26.

The bezel 28 is secured to the protective cover 26 at channel 66. As a result of being placed at this location, the bezel 28 allows the C-clamps 64 of the door frame 52 to engage the stiffener bar 24 without damaging the protective cover 26 as the cover 26 is protected by the bezel 28. Further, the bezel 28 conceals any exposed interior portions of the protective cover 26.

Figure 5:
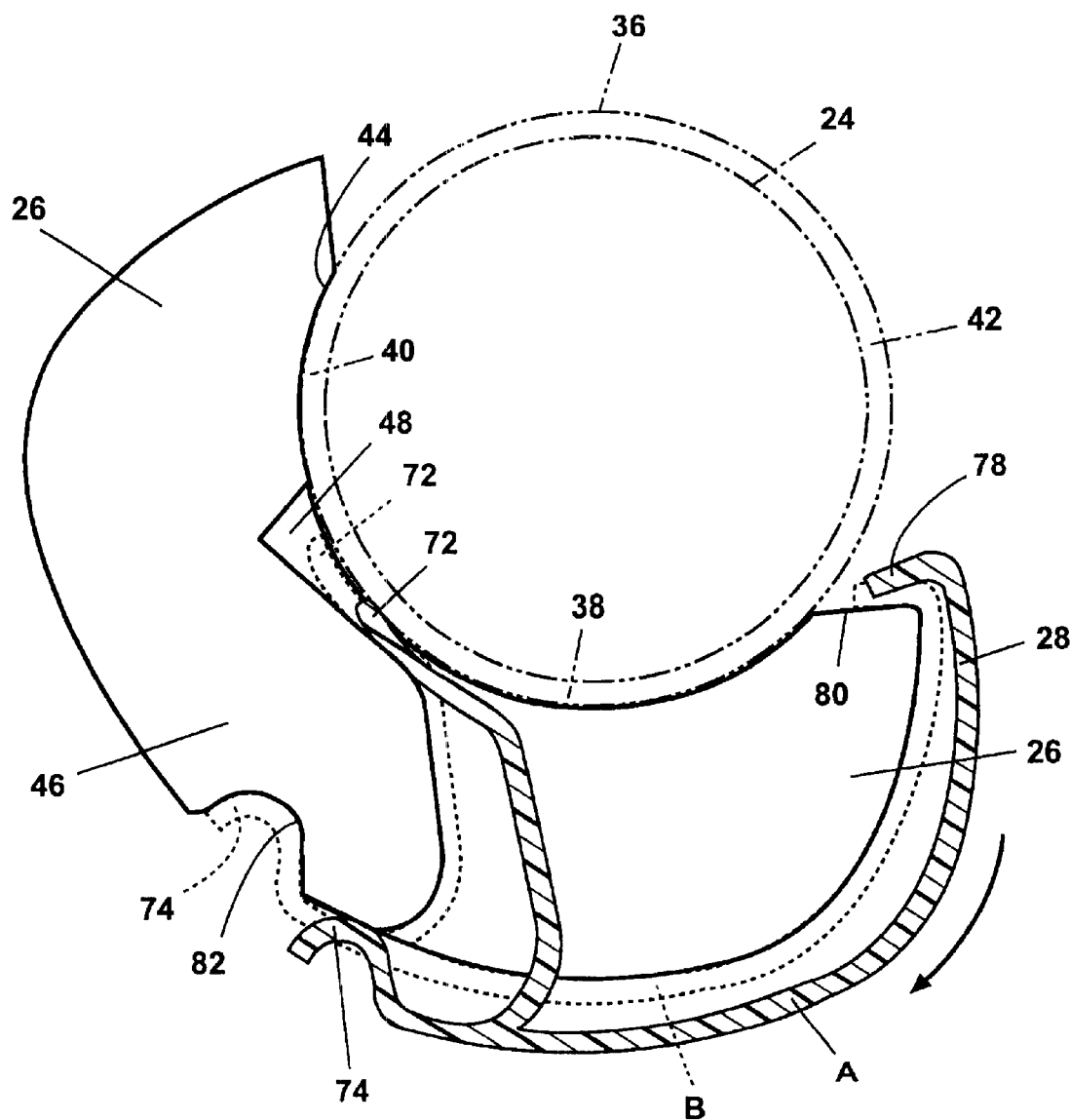
FIG. 5 is a cross section of the stiffener bar of FIG. 1 taken along line 5 illustrating the engagement of the stiffener bar by the stiffener bar bezel.

The bezel 28 includes a base portion 68, two wing portions 70, a vertically extending portion 72, two curved details 74, and an elongated center portion 76. The bezel 28 is secured to the protective cover 26 solely through interaction between the protective cover 26 and between the wing portions 70, the vertically extending portion 72, and the two curved details 74. No additional fastening device is necessary to secure the bezel 28 to the protective cover 26. More specifically, the wing portions 70 of the bezel 28 have inwardly protruding lips 78 which overlap and cooperate with an outer edge 80 of the protective cover 26. Once the lips 78 are brought into contact with the outer edge 80, as seen in FIG. 5, at position A, the remainder of the bezel 28 is rocked into place so that detail 74 engages a well 82 within the protective covering 26 and vertically extending portion 72 engages well 48 in snap fit relationship as illustrated in position B of FIG. 5.

Thus, an enhanced stiffener bar assembly 10 is provided. The stiffener bar assembly 10 includes a stiffener bar 24 covered with a protective energy-absorbing material 26. The stiffener bar 24 contains at least one receptor 50 for receiving a door frame 52. The area surrounding the receptor 50 is bordered by a bezel 28. The bezel 28 is secured to the protective energy-absorbing material 26 and protects the material 26 during installation of the door frame 52 and provides a covering for any exposed material 26.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A structural reinforcement for a motor vehicle, the structural reinforcement comprising:
   a stiffener bar attached to an A-pillar and a B-pillar of a frame of the motor vehicle;
   a protective energy-absorbing material surrounding at least a portion of the stiffener bar; and
   a bezel comprising a base portion, two wing portions, a vertically extending portion, two curved details and an elongated center portion, the bezel covering a portion of the energy-absorbing material and protecting the energy-absorbing material from damage, the bezel secured to the protective energy-absorbing material through cooperation of the wing portions, the vertically extending portion and the two curved details with two wells formed by the protective energy-absorbing material.

2. The structural reinforcement of claim 1, wherein the stiffener bar is attached to the A-pillar and B-pillar using a suitable fastening device.

3. The structural reinforcement of claim 1, wherein the stiffener bar is attached to the A-pillar and B-pillar along a roof line of the motor vehicle.

4. The structural reinforcement of claim 1, wherein the energy-absorbing material is comprised of a foam material.

5. The structural reinforcement of claim 1, wherein the stiffener bar contains at least one receptor for receiving a door frame.

6. A motor vehicle comprising:
   a frame having an A-pillar and a B-pillar;
   a stiffener bar attached to the A-pillar and the B-pillar;
   a protective energy-absorbing material surrounding at least a portion of the stiffener bar;
   a bezel comprising a base portion, two wing portions, a vertically extending portion, two curved details, and an elongated center portion, the bezel covering a portion of the energy-absorbing material and protecting the covered portions of the energy-absorbing material from damage, the bezel secured to the protective energy-absorbing material through cooperation of the wing portions, the vertically extending portion, and the two curved details with two wells formed by the protective energy-absorbing material.

7. The motor vehicle of claim 6, wherein the stiffener bar is attached to the A-pillar and B-pillar using a suitable fastening device.

8. The motor vehicle of claim 6, wherein the stiffener bar is attached to the A-pillar and B-pillar along a roof line of the motor vehicle.

9. The motor vehicle of claim 6 wherein the energy-absorbing material is comprised of a foam material.

10. The motor vehicle of claim 6, wherein the stiffener bar contains at least one receptor for receiving a door frame.

* * * * *